June 10, 1969  G. HOY  3,449,010
LOAD TRANSPORTING VEHICLES
Filed Feb. 13, 1967
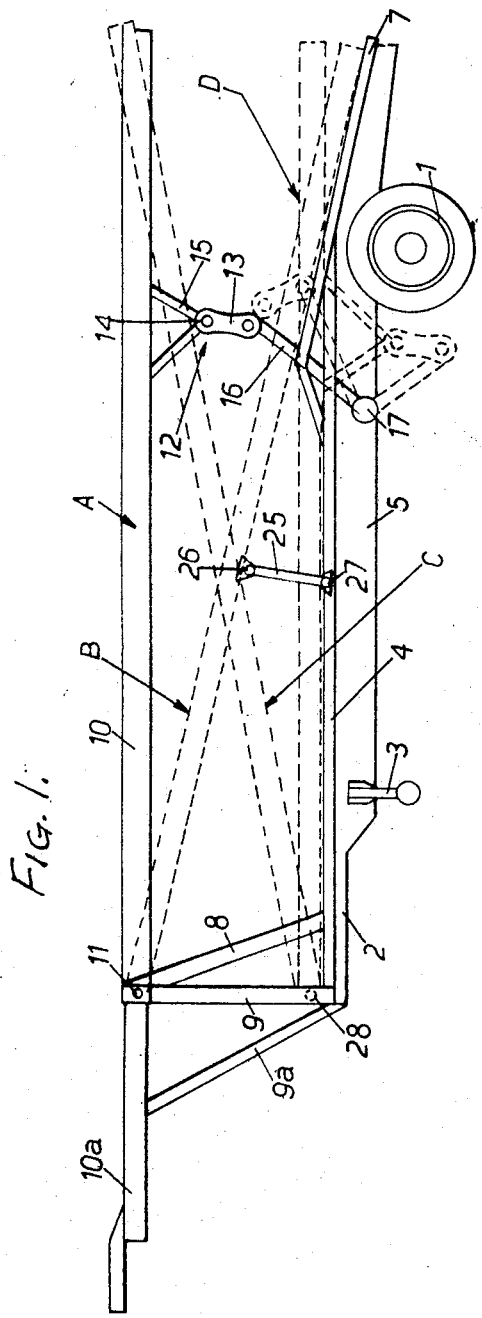
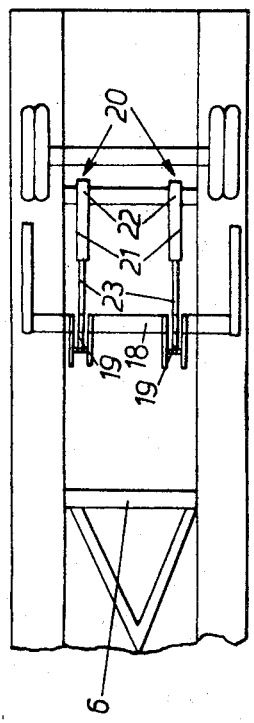
Inventor
GORDON HOY
By *Imrie & Smiley*
Attorneys

United States Patent Office 3,449,010
Patented June 10, 1969

3,449,010
LOAD TRANSPORTING VEHICLES
Gordon Hoy, Chelmsford, England, assignor to Hoynor Limited, Danbury, Chelmsford, England, a corporation of Great Britain
Filed Feb. 13, 1967, Ser. No. 615,518
Int. Cl. B60p 1/16; B62d 23/00
U.S. Cl. 296—1    6 Claims

ABSTRACT OF THE DISCLOSURE

Load transporting vehicle, trailer or wheeled vehicle or self propelled vehicle, having lower deck and upper load carrying platform with means for raising and lowering front and rear ends of upper platform, with removable mid-way prop for upper platform about which upper platform may see-saw, and power operated means for raising and lowering rear end of upper platform.

BACKGROUND OF THE INVENTION

Field of the invention

This invention relates to double deck transporting vehicles such as are used for transporting a heavy load or a load such as a number of vehicles e.g. saloon cars, primarily by road but also by rail.

Description of the prior art

Such transporting vehicles have upper and lower decks on each of which vehicles or other loads are loaded, in the case of vehicles, one behind the other. The lower deck forms the chassis of the vehicle and usually has a ramp disposable to enable cars to be rolled or driven up the ramp onto the lower deck. A higher ramp may be used to load the vehicles or other loads onto the upper deck, or a lift may be employed to raise cars from the lower deck level to the upper deck level. The loading of such transporting vehicles and particularly the upper deck is a time consuming operation and a number of operatives are employed, as well as requiring the provision of loading ramps or lifting means for the upper deck. Moreover the lower deck must be above the rear road wheels of the transporting vehicle thereby increasing the overall height of the fully loaded transporting vehicle and this may not be tolerated in view of bridges under which the loaded vehicles may have to pass.

The main object of the present invention is to provide a transporting vehicle in which the aforesaid disadvantages are minimised.

SUMMARY

According to the present invention a transporting vehicle comprises a lower deck chassis having a pair of road wheels at its rear portion, means at or towards its front end for supporting the front end of the chassis, an upper deck platform supported above the lower deck chassis, an adjustable upper deck front and support operable to support the front end portion of the platform at an adjustable height above the lower deck chassis, a linkage pivotally interconnecting the rear portions of the chassis and platform and having at least one link movably supported on the chassis, and power operated means operable to move said last named link with respect to the chassis to raise and lower the rear portion of the platform.

Preferably an intermediate support is provided for adjustable interconnection of the chassis and platform between the ends, whereby the power operated means may be actuated to raise or lower the rear end of the platform and permit the front end of the platform to be lowered or raised respectively.

Means are preferably provided to lock the adjustable front end platform support at a desired height above the chassis.

In one preferred construction the linkage comprises a first link pivoted at one end to the platform and a second link pivoted at one end to a shaft pivotally mounted with respect to and transversely of the chassis, the free ends of said links being pivotally interconnected, said links being disposed so as not to foul the rear road wheels.

The linkage arm may be disposed beneath or to one side of the chassis and the power operated means comprises a fluid activated ram with piston and cylinder elements, one element being pivoted to the free end of the arm and the other element being pivoted to the chassis about a transverse axis.

BRIEF DESCRIPTION OF THE DRAWINGS

FIG. 1 is a diagrammatic side elevation of a vehicle; and
FIG. 2 is a plan view of the lower deck of the vehicle in FIG. 1 showing the raising and lowering means.

DESCRIPTION OF THE PREFERRED EMBODIMENT

Referring to the drawings the vehicle is shown as a trailer having rear road wheels 1 and the fifth wheel plate 2 at the front end for detachably connecting to the fifth wheel device of conventional construction on a tractor or like towing vehicle; the front end of the vehicle may however be supported on front wheels similar to the rear wheels and then the vehicle is towed through a conventional tow bar by a towing vehicle. Alternatively the front end of the vehicle may have conventional driving means by which the vehicle is self-propelled. In the case of a trailer-type vehicle, the conventional support with castors 3 is usually provided.

The lower deck 4 of the vehicle forms part of the vehicle chassis having longitudinal frame members 5 with spaced transomes 6 or other suitable construction; the deck surface may be plates fixed to the frame members and may extend right over the whole frame or be formed as two longitudinal tracks end to end of the chassis disposed so that a saloon car can be moved along and supported on them. The whole may be secured together by bolts, rivets, welding or all these unions. The rear of the chassis has an inclined portion 7 to which ramp members may be fixed to form a track up which cars or like loads can be moved onto the deck 4. The ramp members may be hinged to the rear of the portion 7 and folded thereon for transit and hinged down to engage the ground for loading.

The front end of the chassis supports adjustable means for supporting the front end portion of the platform 10 so as to permit it to be adjustable in height and to be clamped or otherwise held at any desired height above the chassis as will be described. The adjustable means shown in the drawings comprises uprights 9 fixed at their lower end portions to the front portion of the chassis; the uprights are preferably vertical as shown but they may be upwardly inclined rearwardly or forwardly of the chassis. The uprights 9 on their faces directed inwardly of the vehicle with slots extending over the main portion of their length in which engage stubs or rollers 11 on the sides of the platform or the ends of a transom extending across the platform. Locking means of conventional construction, the details of which form no part of this invention and require no further explanation here, are provided to ensure the stubs or rollers 11 or the ends of the transom to the uprights at any desired height thereon.

The uprights are preferably braced by struts 8 rigidly secured at their opposite ends respectively to the chassis and to the upper portions of the uprights.

An extension 10a may be mounted on the level of the raised forward platform end to provide an additional load carrying area, the rear of the extension being connected to the upper end portions of the uprights; braces 9a may be provided to support the portion of the extension forward of the uprights. The extension may be movably attached to the uprights and the brace 9a may be adjustable whereby the height of the extension may be adjusted.

The rear end portion of the upper deck 10 is supported on the rear of the vehicle by a linkage 12 to be described. The linkage 12 comprises an upper link 13 pivoted at 14 at its upper end to the deck 10, as by a bracket 15 secured thereto, and at its free end pivoted to a second link 16 the lower end of which is pivoted at 17 to the chassis; the pivot at 17 preferably comprises as shown a tube 18 extending across the chassis and at its end portions journalled in the chassis or on brackets secured to the chassis; the link 16 is fast with the tube 18 to swing in a vertical plane when the tube rotates. Also fixed to the tube 18 is an arm 19 disposed to swing in a vertical plane when the tube rotates. Power operated means 20 is mounted in the chassis and is connected to the free end of the arm 19 so that as the means 20 is operated the arm is swung to rotate the tube to swing the link 16 and cause the links 13, 16 to occupy the lowered or partly lowered position shown in dotted lines in FIG. 1 (as 13a, 16a), thereby pivoting the upper deck about the pivot 17 so that when ramp members similar to those of this lower deck are positioned against the rear end of the deck 10, cars or other loads can be loaded onto the upper deck. By reverse operating the power means the loaded upper deck can then be raised into the traveling position shown in FIG. 1.

The power means 20 may be, as shown, a fluid operated ram having a cylinder element 21 hinged at 22 to the chassis while a rod 23 connected to the piston element (sliding in the cylinder and not shown) is pivoted to the free end of the arm 19. The cylinder is preferably hydraulically operated with oil but compressed air may be used. The oil, when used, is forced into the cylinder by a hand pump or by an electrically driven pump energized from the tractor vehicle; any other suitable prime mover may be used, for example an electric motor through a reduction gear, e.g. a 12 volt electric motor and a 200/1 reduction gear.

The whole chassis and platform may be made of any suitable materials, but steel I or ⊏ sections are preferred, although they may for example be of aluminium.

By means of the aforesaid linkage, the lower operated lifting means jacks up the upper deck, and with an hydraulic ram, the upper deck can be gently lowered by operating the release valve of the ram. The linkage and the ram are not used to support the raised upper deck, as a prop (not shown) of any suitable construction may be inserted between the two decks to support the raised upper deck.

One linkage may be provided, but it is preferable to have a linkage at each side of the vehicle which may be outside the frame members 5 and are disposed not to foul the frame or the wheels 1. The power operated means may also be duplicated one at each side of the vehicle if desired. The power operated means is preferably beneath the chassis, but if the arm rises above the lower deck as shown it is preferably at one side of the chassis so as not to interfere with any load thereon.

The aforementioned operation of the linkage has been described with the front end portion of the platform locked in the raised position shown in full lines in FIG. 1 (Position A).

However with the front end portion of the platform unlocked, the front end may be raised or lowered by power operated means such as hydraulic means (not shown) so that with the rear of the platform raised, the platform may be tilted forwardly. Alternatively or in addition to the last named power operated means, a strut 25 may be temporarily pivotally connected at space points thereon to the mid portions of the chassis and platform. When using the strut 25 and the platform tilted rearwardly larger types of vehicles such as farm tractors or bulldozers for example may be supported on the platform for transporting thereon.

The strut 25 may be stowable under the platform so as to be lowered into the position in FIG. 1, pivoting about the point 26 and the pivot 27 may then be locked to the chassis by conventional locking means. The front end portion of the platform can then be unlocked from the uprights to allow the front end portion to be lowered onto the chassis. The front end portion of the platform may remain unlocked and the linkage 13, 16, 17 operated to lower the rear of the platform which thus operates like a see-saw about the pivot 26 to raise the front end of the platform or vice-versa.

With the front end of the platform lowered and the locking means securing it in this position, the linkage can be operated to lower the rear end of platform to dispose the whole platform at rest on the chassis 4. The vehicle can then be used as a single deck vehicle for load transporting.

If desired the strut 25 may be replaced by a power operated means such as a hydraulic ram whereby the mid portion of the platform may be adjusted in height and locked or held at any desired height. Also the raising and lowering of the front or rear portions of the platform or its mid portion may be effected by other suitable means such as mechanical means e.g. screw jacks, electric means e.g. electric motors or hydraulic means such as hydraulic cylinder devices.

It will be seen that by the simple pivoting of the upper deck, the whole vehicle is made a light structure of simple construction capable of simple and easy operation.

I claim:

1. A double deck transporting vehicle comprising a chassis having a pair of road wheels at its rear portion, means at or towards its front end for supporting the front end of said chassis, a lower deck associated with said chassis, an upper deck platform supported above said lower deck, said upper deck platform having a front end portion spaced above and overlying a corresponding end portion of said lower deck an adjustable upper platform front end support operable to support the front end portion of said platform at an adjustable height above said lower deck, a linkage pivotally interconnecting the rear portions of said chassis—lower deck assembly and said platform and having at least one link movably supported on said assembly, and power operated means on the chassis operable to move said last named link with respect to said assembly to raise and lower the rear portion of said platform, an intermediate support being provided for adjustable interconnection between said assembly and said platform between their ends, whereby said power operated means may be actuated to raise and lower the rear end of said platform and permit the front end of said platform to be lowered and raised respectively.

2. A vehicle according to claim 1 wherein locking means are provided to lock the front end of said platform to said support at a desired height above said assembly.

3. A vehicle according to claim 1 wherein said upper platform front end support comprises a substantially upright at each side of said assembly forward end, a generally vertical platform guide on each said upright, an element at each side of said platform front end portion in guided engagement with one of said guides, and locking means operable to maintain said elements supported on said supports at a selected height above said lower deck.

4. A vehicle according to claim 1 wherein a stowable ramp is provided for movement from a stowing position to a rearwardly extending position to form an inclined load surface between the rear of the lower deck and the ground to the rear of the vehicle.

5. A vehicle according to claim 1 wherein said power operated means comprises at least one arm pivoted at spaced points thereon to said assembly and a link, said link at a point thereon spaced from said pivot being pivoted to said upper platform, and a power unit mounted on said assembly and connected to said arm and operable to rotate said arm with respect to said assembly to raise and lower said platform rear end portion.

6. A vehicle according to claim 5 wherein said support at its upper portion has a forwardly extending platform to form a raised load supporting area.

References Cited

UNITED STATES PATENTS

| | | |
|---|---|---|
| 3,145,043 | 8/1964 | Gyori. |
| 2,908,527 | 12/1959 | Risner. |
| 2,765,938 | 10/1956 | Addezio. |

FOREIGN PATENTS 858,834   1/1961   Great Britain.

PHILIP GOODMAN, *Primary Examiner.*

U.S. Cl. X.R.

105—368